Sept. 24, 1968 E. V. BOBLETT 3,403,387

ELECTRON BEAM INFORMATION REPRODUCING APPARATUS

Filed July 26, 1966 2 Sheets-Sheet 1

INVENTOR.
EMIL V. BOBLETT
BY Robert G. Clay
ATTORNEY

INVENTOR.
EMIL V. BOBLETT
BY Robert S. Clay
ATTORNEY

United States Patent Office 3,403,387 Patented Sept. 24, 1968

3,403,387
ELECTRON BEAM INFORMATION REPRODUCING APPARATUS

Emil V. Boblett, Los Altos Hills, Calif., assignor to Ampex Corporation, Redwood City, Calif., a corporation of California Filed July 26, 1962, Ser. No. 212,546
9 Claims. (Cl. 340—173)

ABSTRACT OF THE DISCLOSURE

System employing a special medium and an electron beam which directly impinges the medium, to provide readout of information recorded as contrasting opaque and transparent elemental areas, wherein the medium includes an electron responsive sincttillating material which upon readout causes light radiation from within the medium which is sensed to provide output signals representative of the stored information.

In the data storage field, one major goal is to provide a system that affords wide bandwidth signal processing so that information signals in the ultra high frequency range, such as 50 megacycles per second and above for example, may be recorded and reproduced. Another major goal is to achieve high density recording and playback whereby a large amount of information may be processed while employing the least storage space. In addition, it is desirable to have good playback signal resolution, as well as an efficiently operating system. Moreover, these features should be obtainable with a minimum number of mechanical and electrical system parts thereby entailing a minimum of cost and maintenance.

It is highly preferable to employ a signal reproduce system wherein an electron beam serves to scan and read out the recorded information. High scanning speeds are possible with an electron beam, and therefore very high frequency signals may be read out thereby. Also, electron beams with a controlled beam spot size can be utilized to scan very minute information areas or bits of a medium having a high packing density. Furthermore, images or patterns that are scanned by electron means may be processed electronically and enlarged for viewing on a monitor with a minimum of optical distortion; whereas readout of recorded images by optical means is subject to lens aberrations and other optical deficiencies and problems.

In the present state of the art, magnetic tape is generally used for storage of wideband signals, such as video or radar signals. As is well known, a wideband signal magnetic tape apparatus uses an electromechanical scanning means, which is inherently limited in scanning speed when compared to electron beam scanning that is achieved with practically no inertia. Also, when using magnetic tape as a storage medium it becomes necessary to employ a multiplicity of mechanical parts for driving the tape and for maintaining the tape at a regulated speed. Furthermore, in order to read out the magnetically recorded information with a minimum of error in frequency and phase of the playback signal, complicated electronic circuitry is required. In addition, the bandwidth of the signal that may be recorded on a magnetic tape is limited because the inherent characteristics of magnetic tape and magnetic heads preclude successful operation at ultra high frequencies with the present state of the art.

More recentiy, recording on a thermoplastic medium has been proposed to provide increased packing density and bandwidth capabilities. But thermoplastic systems have certain disadvantages that affect the fidelity of the readout signal. The thermoplastic film generally requires guard bands; and is limited in optical readout frequency by the associated apparatus, such as flying spot scanners or image orthicons. In optical readout, thermoplastic records are particularly susceptible to dust scratches or foreign matter, which act as scattering sources, especially in dark areas that are flat and transparent. Therefore, it would be advantageous to utilize an information carrier or storage medium that avoids the problems of magnetic tape and thermoplastic film, and yet provides wide bandwidths storage and high packing density.

Conventional photographs or transparencies contain large amounts of information in the form of areas of opacity and transparency, including intermediate halftones or gray areas. A transparency may be likened to a stationary or fixed television image or raster having a multiplicity of tightly packed horizontal lines of information, each line consisting of a number of discrete areas or information bits, each bit representing a signal or impression having a magnitude between and including the maximum degree of opacity and the maximum degree of transparency. There is commercially available at this time an electron beam-responsive film that registers information in the form of a transparency in accordance with an applied electron beam modulated by an information signal. Such a film usually employs a Lippman emulsion and is presently distributed by the Eastman-Kodak Company. As known today, transparencies are generally viewed or read out by an optical projection system, which includes various lenses and other optical parts that are subject to optical errors or diminution of output signal.

With either a conventional transparency produced by camera or optical means, or a transparency exposed by electron beam scannnig means, it would be highly advantageous to utilize electron beam scannng for readout. High bandpass capacity would be possible, and transformation of the optical information to an electrical signal for further utilization may be achieved. Such features are especially useful for nonpictorial information, registered in a pattern consisting of opaque and transparent areas representing signal intelligence on a transparent medium.

An object of this invention is to provide an improved storage and playback system.

Another object of this invention is to provide a novel storage medium that affords readout of information at ultra high frequencies.

Another object is to provide a novel and improved electron beam readout system.

According to this invention, a signal storage recording and reproducing system comprises a storage medium constituted as a photographic film or transparency in combination with a very thin electron-responsive scintillating material. The information, which is registered as contrasting opaque and transparent elemental discrete areas or information bits with discernible half-tones or gray areas, may be read out by electron beam scanning of the transparency, in a well known manner. The scanning readout electron beam causes photon emission or light radiation from the scintillator successively behind each elemental discrete area that is scanned. The light radiation passes through the transparent and gray elemental areas of the film or transparency with an intensity that is related to the magnitude of transparency at the elemental area being scanned, and the passed radiation is detected by a photomultiplier. The detected radiation may then be transduced to an electrical signal for further utilization.

The invention will be described in greater detail with reference to the drawing, in which.

Figure 1:
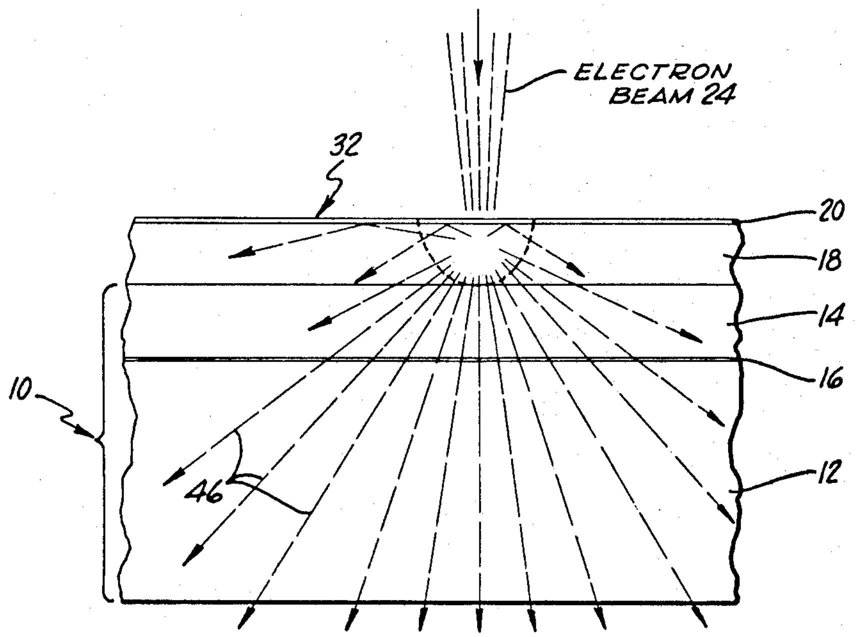
FIGURE 1 is a fragmentary side view of an elemental area of a storage medium in accordance with this invention.

Similar reference numerals are used to designate similar parts throughout the drawing. It should be noted that the proportions of several parts of the drawing, especially the thickness of the layers forming the storage media depicted in FIGURES 1 and 2 are not precisely represented in view of space limitations.

Figure 2:
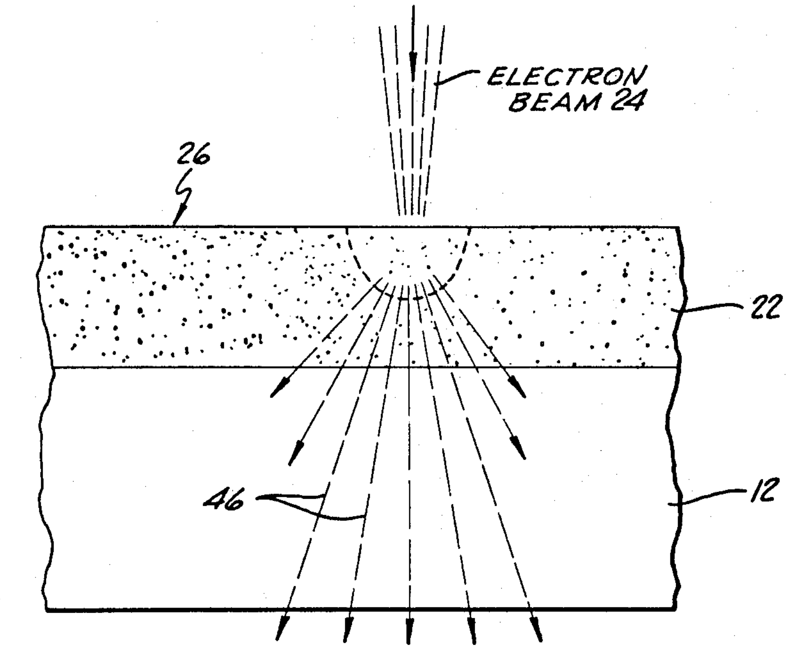
FIGURE 2 is a fragmentary side view of an elemental area of a storage medium that may be used as an alternative, according to this invention.

In FIGURE 1, an embodiment of the invention comprises a transparency or film 10 (only a discrete elemental area being shown) that includes a base 12, which may be an optically clear plastic sold under the trade name Mylar, that is transparent to light radiation. If the photographic information is to be registered by exposure to light, such as achieved by camera or other optical means, a photosensitive emulsion layer 14, such as silver halide, may be fixed directly onto the base 12. However, if the information is to be recorded by scanning with a modulated electron beam, then a Lippman type emulsion layer 14 that is responsive to electron energy is deposited on the base 12. In such event, an extremely thin transparent conductive layer 16, such as aluminum, is deposited beforehand by evaporation or other known means onto the supporting base 12 to prevent "blooming" or spurious deflection of the electron beam during recording with the beam. That is, the conductive layers drain any electrostatic charge which might be generated in the medium during the record or readout processes.

The combination of layers 12 and 14, or the alternative combination of layers 12, 14 and 16 provide a film or a transparency 10 that can store information in the form of varying degrees of opaqueness and transparency. The film 10 preferably has a very fine grain to allow a high packing density, with each discrete elemental area carrying information that may be read out by electron beam scanning methods. After the information is recorded, the film or transparency 10 may be chemically fixed to produce a permanent record of the information.

In accordance with this invention, the storage medium or transparency 10 is coated with a thin layer of a homogeneous scintillating material 18, which may be a plastic scintillator consisting substantially of (1,4-bis-{2[5 phenyloxazolyl]}benzene) which for simplicity is referred to in the art as "PoPoP," terphenyl and polyvinyl toluene for example, that is applied directly to the emulsion 14. Thereafter, a thin layer of a substantially light opaque conductive coating 20 is deposited on the scintillator material 18 to complete an inventive storage medium 32 that may be used for readout by electron beam scanning means.

The medium 32 with the scintillator 18 may consist of a single frame of information, or may be a continuous series of frames that provide a sequence of varying information, such as may be provided with a motion picture. Moreover, in view of the bandpass capacities of the inventive storage medium 32, non-pictorial information having signal frequencies in the 50 megacycle range may be recorded and read out, in accordance with this invention. The major limitations to extending the bandwidth exist in the capabilities and scanning speed of the electron beam, the composition and fineness of granularity of the emulsion, and the decay time of the scintillator material, among other things.

In FIGURE 2, another embodiment of the inventive structure employs only two instead of the five layers depicted in FIGURE 1. This alternative embodiment comprises a base 12, with a single layer 22 disposed thereon and formed from a homogeneous mixture of a photosensitive emulsion, a scintillator and an electrically conductive material. Thus when an electron beam 24 is focused on the elemental area 26, scintillation or light radiation is developed within the layer 22 having the emulsion. By employing a mixture of these various elements in the one layer 22, separate processing of the photographic emulsion and application of the scintillator as a separate layer is avoided.

With this combination, the resolution of the readout signal is improved because light is emitted within the layer 22 containing the emulsion. Also, this configuration allows simultaneous readout of a signal being written by means of a modulated electron beam, because scintillation occurs during the writing process. Therefore, dropouts and erroneous signals may be detected during the writing process so that immediate correction and compensation may be provided.

Figure 3:
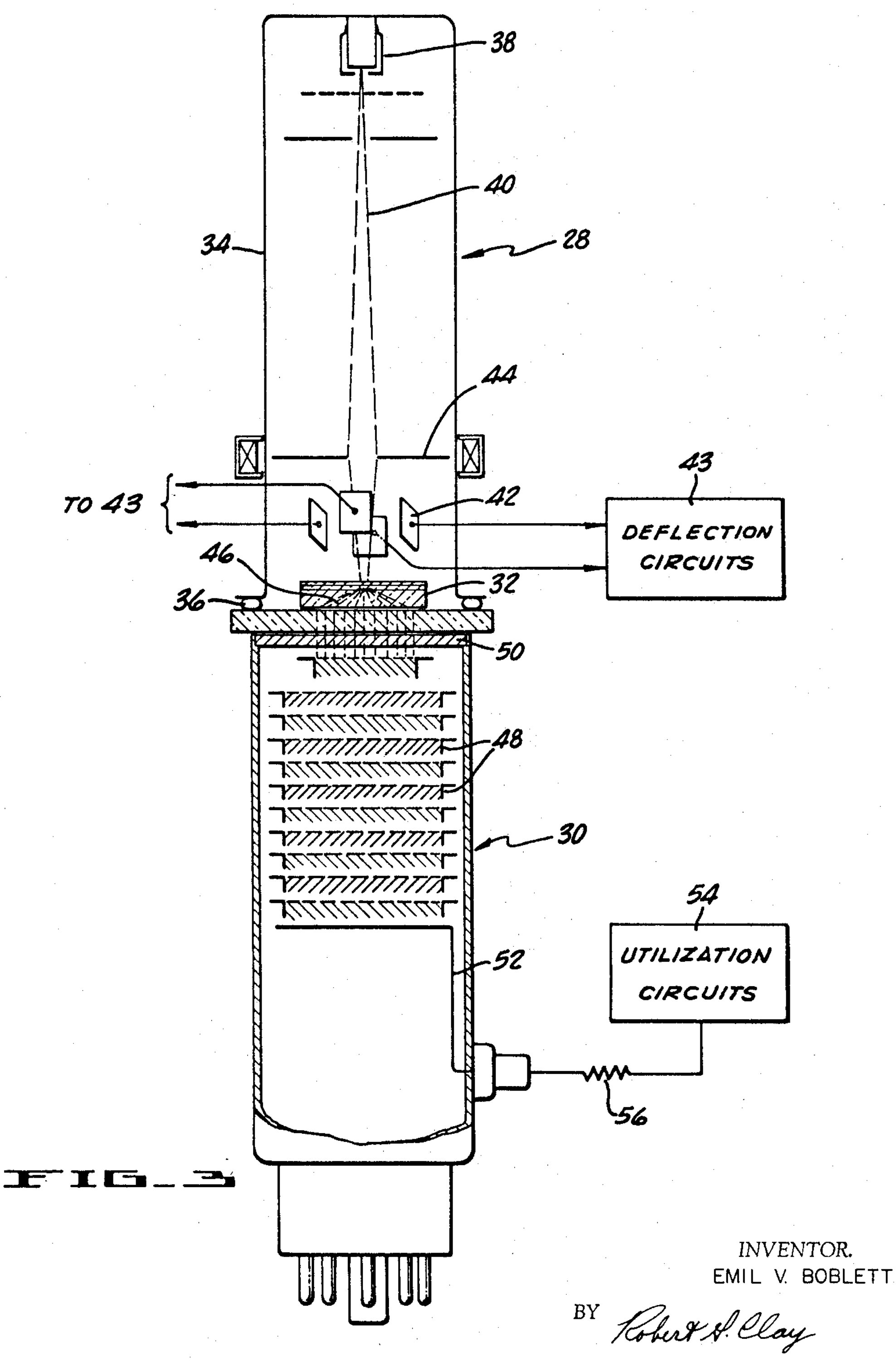
FIGURE 3 is a schematic view of a readout apparatus employing the inventive storage medium of this invention.

To achieve playback of the recorded information, a cathode ray or electron beam scanning tube 28 in combination with a photomultiplier tube 30, as depicted in FIGURE 3, may be employed. For the purpose of explanation, it is assumed that the five layer storage medium 32 of FIGURE 1 is being utilized for readout. The storage medium 32 may be mounted within the evacuated glass envelope 34 of the cathode ray tube 28 through means of an access flange 36 with the light opaque conductor 20 and the scintillator layer 18 facing towards an electron gun 38. For purpose of convenience, the external power supplies that energize the various electrodes are not shown.

During operation of the apparatus, a readout electron beam 40 is derived from the gun 38 and deflected by electrostatic deflection plates 42 (or by electromagnetic means) controlled by deflection circuits 43 for scanning the inventive storage medium 32 in a television raster path, for example. The electron beam 40 is made to converge on each elemental area by means of an electrostatic lens system 44 located between the gun 38 and the target medium 32. As the electron beam 40 strikes an elemental area of the storage medium 32, the beam 40 penetrates the thin opaque conductor 20 and impinges on the scintillator 18.

As shown in FIGURES 1 and 2, the scintillator 18 is activated by the electrons of the beam to produce light radiation 46 that passes through the elemental area of the emulsion 14. The opaque conductor 20 serves to reflect light towards the emulsion 14 thereby increasing the efficiency of the readout process. Furthermore, the conductor 20 prevents charging of the scintillator 18, which would result in distortion of the readout electron beam 40.

As the electron beam scanning progresses and light radiation is sequentially produced at the transparent and half-tone elemental areas, the light rays 46 pass through these areas of the storage medium and energize the photomultiplier tube 30. In contrast, the opaque elemental areas of the emulsion layer 14 block passage of the light rays 46, and therefore no radiation appears at the photomultiplier 30 when an opaque area is scanned.

The photomultiplier tube 30 may be of the unfocused dynode type employing "venetian blind" dynodes 48. The light radiation 46 received from each transparent elemental area of the medium 32 is directed to a photocathode 50 on the face of the tube 30, and an electrical current having an intensity related to the magnitude of the received light radiation 46 is developed by means of the dynode configuration 48 and supplied to an output electrode or anode 52. The anode 52 provides an electrical output signal to a utilization circuit 54 through a resistor 56, the output signal at any given time having a voltage or magnitude related to the degree of transparency of the elemental area being scanned at that time. The photomultiplier 30 may be placed directly adjacent to the face of the tube 28 and thus very close to the storage medium 32 thereby precluding the necessity for an optical system with its inherent loss of light. Alternatively the photomultiplier elements may be inserted in the vacuum atmosphere of the cathode ray tube 28 so that the photocathode may be located closely adjacent to the storage medium 32.

In a successful embodiment of this invention, the following thicknesses for the various layers of the inventive structure shown in FIGURE 1 were employed:

| | | |
|---|---|---|
| Opaque conductor **20** | Angstroms | 1000 |
| Scintillator **18** | microns | 1.5 |
| Emulsion layer **14** | inch | .0003 |
| Transparent conductor **16** | Angstroms | 200 |
| Base **12** | inch | .003 |

With a storage medium 32 having such dimensions, an electron scanning beam of 15 kilovolts having a spot size of about 3 microns in diameter was employed. With the above described apparatus, it was observed that lines of 2–3 microns in diameter could be recorded and played back with good resolution and improved bandwidth capabilities, including signals of 50 megacycles per second. A highly improved modulation efficiency and better contrast was achieved in comparison to the performance of a thermoplastic film readout system.

By use of a plastic scintillator having a rapid decay time, such as $10^{-8}$ second for transition from maximum light emission to ½ light emission, rapid scanning is possible to achieve readout of very high frequency signals. Furthermore, the scintillator 18, when used as a separate layer as illustrated in FIGURE 1, may be removed from the transparency and replaced after excessive wear caused by extensive electron beam scanning, and the transparency may thus be utilized indefinitely. Also, the inventive system may be employed with color transparencies, the only variation being in the use of separate photomultiplier tubes coupled to selective color filters.

The scope of the invention is not necessarily limited to the structures and values shown and described above. For example, the storage medium may employ a fast decay phosphor or a nonplastic scintillator, but it is recognized that the inherent limitations of a slower decay time reduces the available bandpass. In this vein, it is noted that a plastic scintillator has a decay time of about $10^{-8}$ second, whereas a fast decay phosphor such as P16 has a rated decay time of $2\times10^{-7}$ second. Thus, it has been determined that since signals having a frequency of 5 megacycles per second may be readily processed when utilizing a P16 phosphor such as found in a television system, then a plastic scintillator should be usable for a signal frequency of 100 megacycles per second.

What is claimed is:

1. A photographic storage medium for use in a readout system which utilizes an electron beam for scanning the medium comprising:

a photosensitive structure including a photosensitive emulsion responsive to light variations of a photographic process for recording information in the form of opacity and transparency which represents such variations; and a scintillating material in contact with said emulsion for generating light radiation from within the storage medium in response to the direct impingement thereof by the electron beam, said light radiation passing through said structure in proportion to said opacity and transparency, said scintillating material being a non-granular homogeneous organic material having a decay time of the order of $10^{-8}$ seconds for transition from maximum light emission to one-half light emission.

2. The photographic storage medium of claim 1 wherein said scintillating material is homogeneously mixed with said photosensitive emulsion for developing said radiation from within said homogeneous mixture upon the direct impingement of said electron beam.

3. The photographic storage medium of claim 1 wherein said scintillating material defines a layer disposed adjacent to said photosensitive structure for generating therein said light radiation in response to the direct impingement of said electron beam, said generated light radiation passing through the photosensitive structure in proportion to the opacity and transparency of the structure.

4. The photographic storage medium of claim 3 further comprising:

a transparent base upon which said photosensitive emulsion is disposed to define said photosensitive structure; and a conducting layer disposed on said scintillating material layer to dissipate electrostatic charges which build up in the medium.

5. The photographic storage medium of claim 4 further comprising:

a conductive transparent coating disposed on the surface of said base for dissipating electrostatic charges generated in the medium;

said photosensitive emulsion being disposed on such transparent coating;

said scintillating material layer being disposed on said emulsion; and said conducting layer further defining a light opaque layer disposed on said scintillating material layer to further reflect the light generated within the scintillating material past the photosensitive emulsion.

6. The photographic storage medium of claim 2 wherein said homogeneous mixture defines a layer in which the information is recorded in the form of areas of opacity and transparency.

7. A readout system for reproducing information recorded in a photographic storage medium in the form of variations in opacity and transparency, including a scanning electron beam, the system comprising:

a photosensitive structure including a photographic emulsion for recording the information in the form of alternate areas of opacity and transparency;

a scintillating material disposed in contacting relationship with the photosensitive structure and responsive to the scanning electron beam for developing light radiation within the photosensitive structure of said storage medium said scintillating material being a non-granular homogeneous organic material having a decay time of the order of $10^{-8}$ seconds for transition from maximum light emission to one-half light emission, said scanning electron beam being disposed to directly impinge said scintillating material; and photomultiplier means disposed to directly receive the light radiation which passes through the photosensitive structure, said received light being representative of the degree of opacity and transparency and thus of the information recorded in the photosensitive structure.

8. The system of claim 7 wherein said scintillating material is disposed as a layer on said photosensitive structure.

9. The system of claim 7 wherein said scintillating material is homogeneously mixed with said photographic emulsion to define a layer for retaining said recorded information which layer is also responsive to the scanning electron beam.

References Cited

UNITED STATES PATENTS

| | | | |
|---|---|---|---|
| 2,865,744 | 12/1958 | Friedmann | 96—27 |
| 2,887,379 | 5/1959 | Blake | 96—45.1 |
| 3,054,961 | 9/1962 | Smith | 340—173 |
| 3,102,998 | 9/1963 | Staehler | 340—173 |

TERRELL W. FEARS, *Primary Examiner.*